J. W. BRYCE.
RECORDER.
APPLICATION FILED APR. 10, 1907.

1,238,254.

Patented Aug. 28, 1917.
9 SHEETS—SHEET 1.

Fig. 1,

WITNESSES:
John O. Gempler
E. Martin.

INVENTOR
James W. Bryce,
BY
Kenyon & Kenyon,
his ATTORNEYS

J. W. BRYCE.
RECORDER.
APPLICATION FILED APR. 10, 1907.

1,238,254.

Patented Aug. 28, 1917.
9 SHEETS—SHEET 6.

WITNESSES:
John O'Gempler
E. Martin

INVENTOR
James W. Bryce,
BY
Kenyon & Kenyon,
his ATTORNEYS

J. W. BRYCE.
RECORDER.
APPLICATION FILED APR. 10, 1907.
1,238,254.
Patented Aug. 28, 1917.
9 SHEETS—SHEET 7.
Fig. 9,
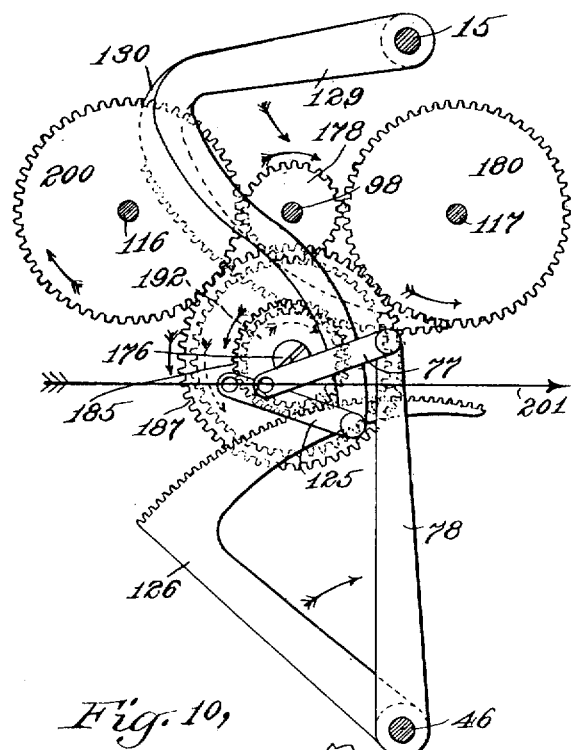
Fig. 10,
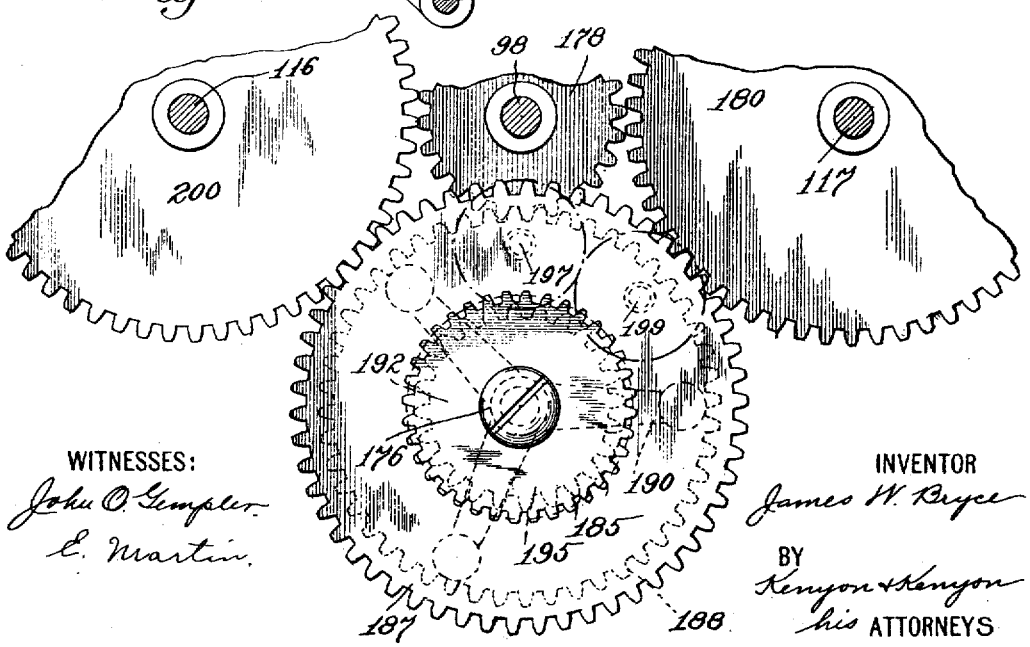
WITNESSES:
John O. Gempler
E. Martin
INVENTOR
James W. Bryce
BY
Kenyon & Kenyon
his ATTORNEYS

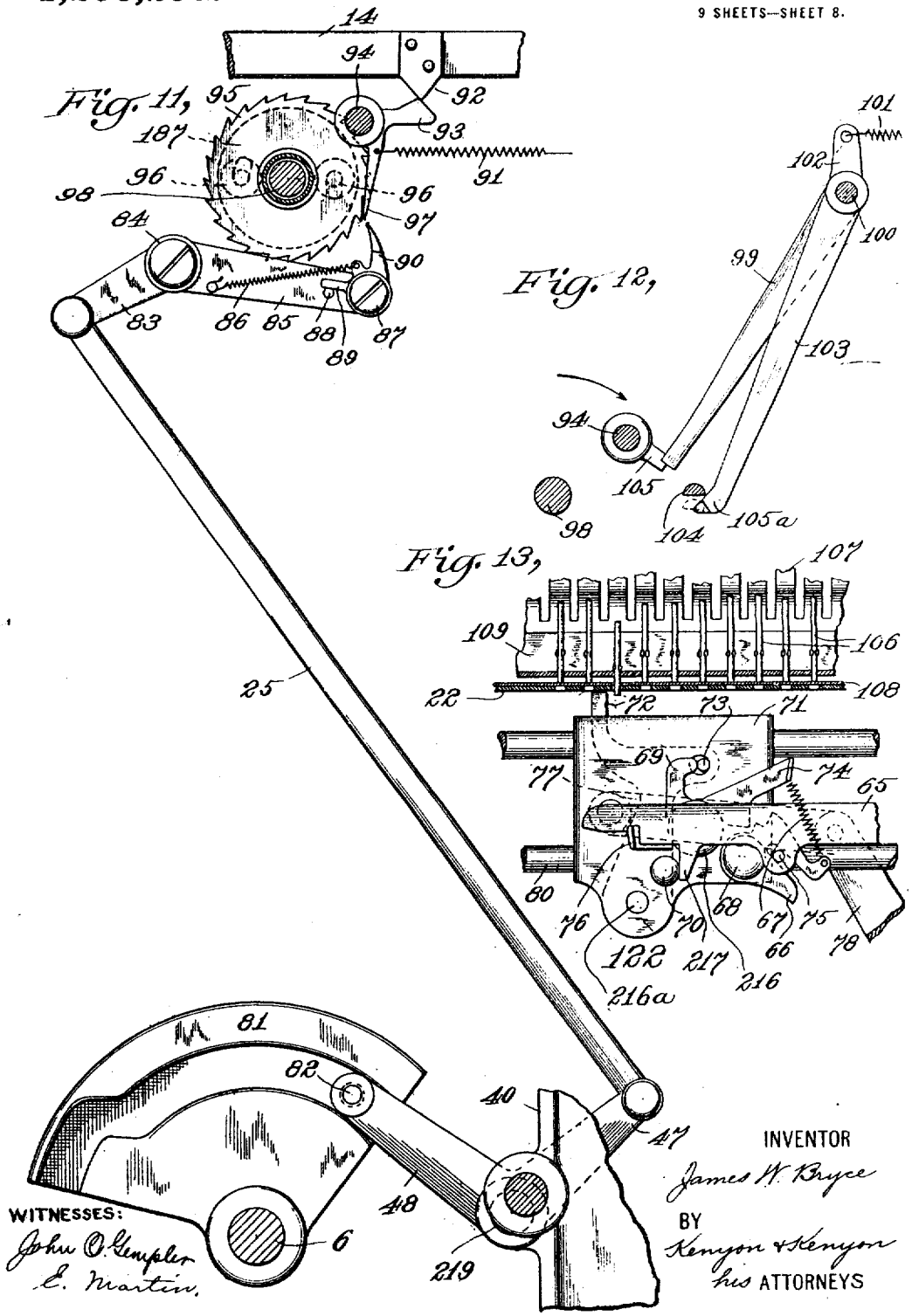

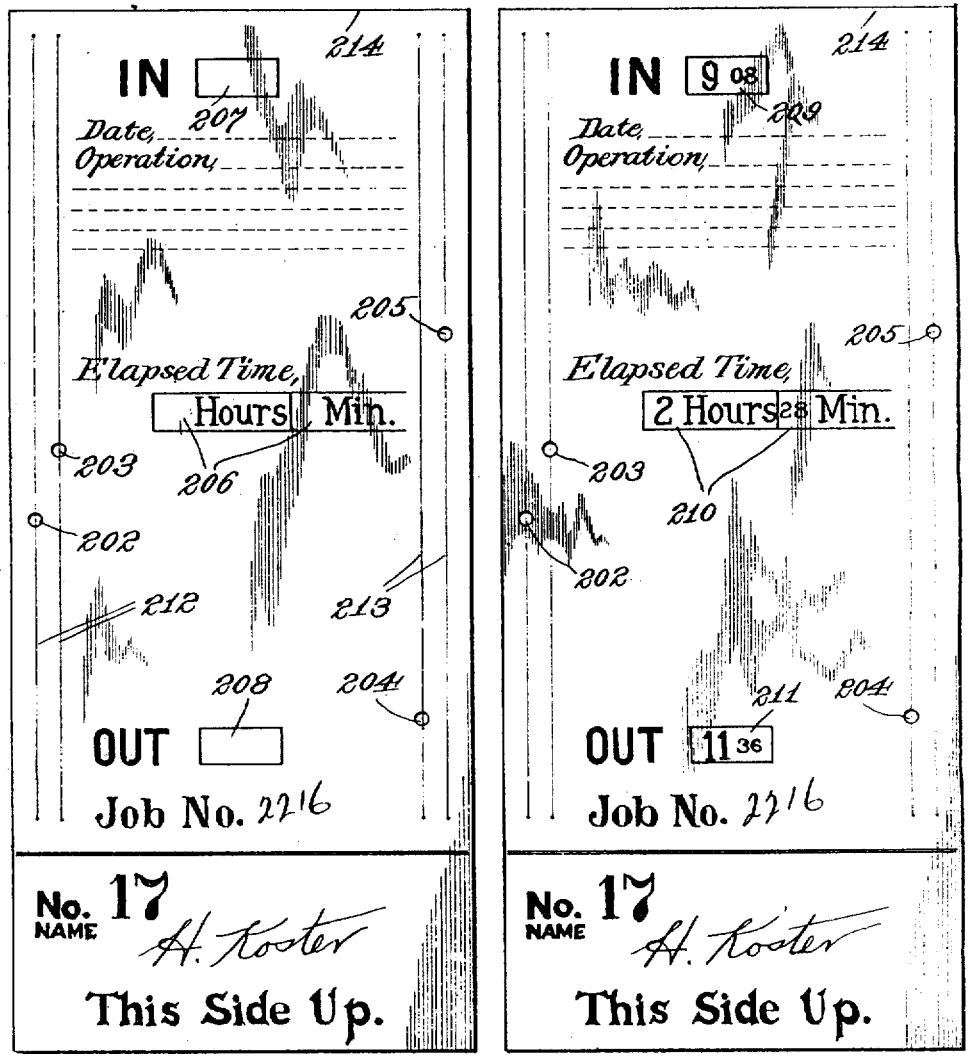

UNITED STATES PATENT OFFICE.

JAMES W. BRYCE, OF BROOKLYN, NEW YORK, ASSIGNOR, BY MESNE ASSIGNMENTS, TO THE INTERNATIONAL TIME RECORDING COMPANY, OF ENDICOTT, NEW YORK, A CORPORATION OF NEW YORK.

RECORDER.

1,238,254.      Specification of Letters Patent.      Patented Aug. 28, 1917.

Application filed April 10, 1907. Serial No. 367,414.

*To all whom it may concern:*

Be it known that I, JAMES W. BRYCE, a citizen of the United States, and a resident of Brooklyn, in the county of Kings and State of New York, have invented certain new and useful Improvements in Recorders, of which the following is a specification.

My invention relates to recorders. It has for its object to provide apparatus for producing an indication, preferably by printing, of the data represented by devices or marks representing the data of the operation or operations of a machine and preferably of a machine other than the one embodying my present invention. It is of especial value in connection with time recorders and particularly with machines for registering the time of the beginning and the time of the ending of an operation and the elapsed time that has occurred between the two operations although my invention in some of its broad features is not limited to use in such machines. In the particular machine forming an embodiment of my invention, shown in the drawings herein, I have shown an apparatus which is capable of being controlled in its indicating operations by devices, in this case time marks on a card, which marks represent the data of the operation of another machine which has recorded in linear measurements the time of the beginning of the job, the time of the first operation of the said other machine, also the time of the completion of the job, the time of the second operation of the said other machine; and also the elapsed time occurring between the two said operations. In the present case, the devices might be other than identification marks on a card and any suitable device could be used for setting such devices and such identification devices might represent other values than those of time. The particular machine shown in the drawings herein and more particularly described hereafter is intended, however, to coöperate with another machine devised by me forming the subject-matter of another application for patent executed and filed simultaneously herewith. In such other machine, time marks are made upon a card in the form of holes punched therein, one hole representing in its linear position on the card the time of the first operation of the said other machine and the other hole representing in its linear position on the card the time of the second operation of the machine, and the linear distance between the two punched holes representing in units of linear measurement the elapsed time between the two operations.

The particular apparatus shown herein is, in its indicating operations, controlled by such a card and indicates the values represented by such holes by printing upon the card the time of the first or "in" operation, the time of the second or "out" operation and the time in hours and minutes of the elapsed time between the two. My invention has further for its object to provide new, improved and simplified means for operating devices for indicating the difference between two operations of a machine as, for example, a machine for indicating elapsed time; also the use of a differential in such connection; also new and improved means for indicating the time of the "in" and "out" operation of such a machine; also generally to improve and simplify and make more durable and certain in operation the various parts of such a machine.

My invention consists in the novel devices and combinations herein set forth.

I will now proceed to describe the preferred form of my invention which is embodied in the drawings accompanying this specification and forming part hereof. In the form here shown my improved apparatus is intended to translate into printed characters the time of the "in" and "out" operations and the elapsed time occurring between the two said operations of a machine, such as is shown in my said accompanying application of even date herewith, from the data representing such times as indicated in time marks, as shown by holes punched in a card, representing in units of linear measurements such times. Such a card with its time marks on it is shown in Fig. 14. As there shown, the card is provided with four holes, holes 202 and 203 representing in linear measurements the time of the "in" and "out" operations of the machine referred to in hours, and holes 204 and 205 representing similarly the minutes of the "in" and "out" operations of said machine respectively. The card shown in Fig. 14 thus provided with the punched holes is inserted in my improved machine of the present application, and by the operation of that machine the time data represented by the said four holes in their linear position or location on the card is translated into the printed characters representing the same times. These appear on the card shown in Fig. 15 as "9 08" for the "in" time, "11 36" for the "out" time, and "2 hours 28 min." for the elapsed time.

Referring to the particular embodiment shown in the drawings, Figure 1 is a front view of a preferred form of my improved device showing the operating handle 1, the slot 3 into which the card is inserted, and the two small cranks 4 and 5 by which the ink ribbon is moved or fed.

Fig. 9 is a semi-diagrammatic view of the hour differential after it has been moved by the selector blocks to the position controlled by the punched holes in the card.

Fig. 10 is a face view of the hour differential showing the gears connecting it with the type wheels.

Fig. 11 is a face view of the subtractor device with its operating cam.

Fig. 12 is a face view of the subtractor set-up or the device which renders the subtractor device operative or inoperative according to the previous movement of the minute elapsed-time type wheel.

Fig. 13 is a face view of the "out" selector block on the hour side of the mechanism and shows the detachable connections between the draw-bar 65 of the carriage and the selector block 71, and also the manner in which the pins of the pin boxes control the movement of the selector blocks.

Fig. 14 shows a card after it has been treated by the machine described in my accompanying application and before it is inserted in the machine of the present application.

Fig. 15 is a view of the same card after it has been subjected to treatment in the machine of the present application.

Figure 1:
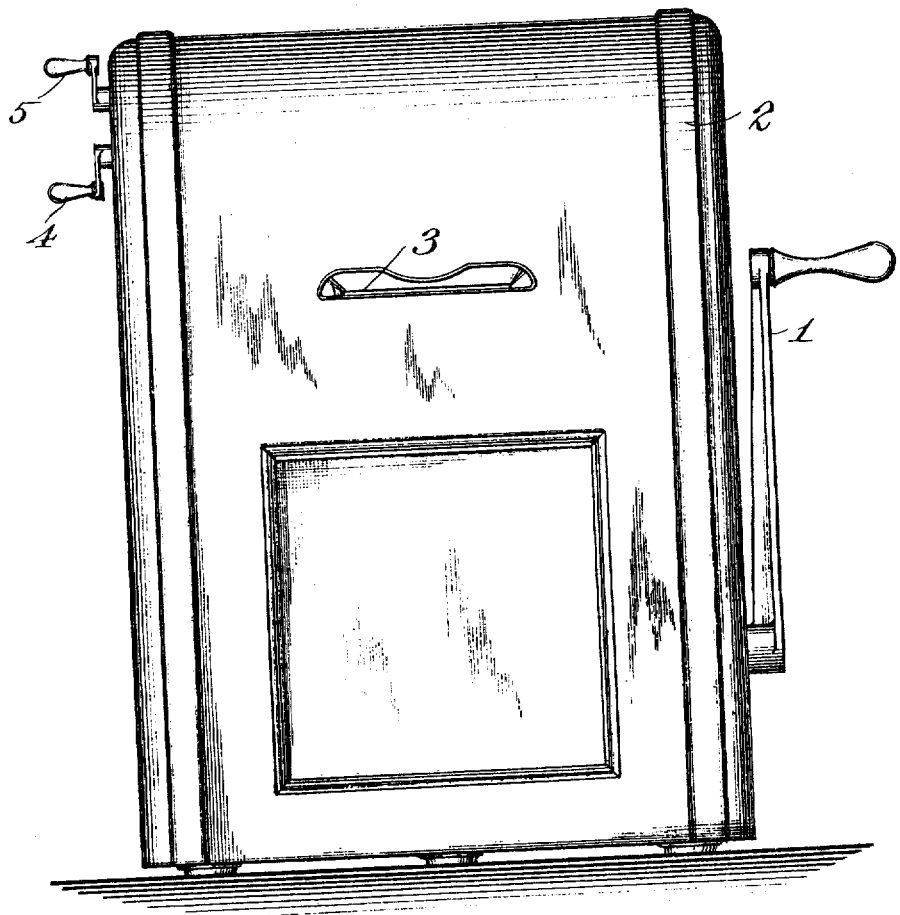

1 is the operating handle, 2 the casing and 3 the slot into which the card to be operated upon is inserted by the operator. 4 and 5 are handles for moving the ink ribbon 56 in either direction as desired. Of course any suitable mechanism for feeding the ink ribbon could be employed, and for reversing its feed, either automatic or manual. I have in the present case simply shown a manual device for feeding the ink ribbon in either direction at will. It will be understood that the shafts of each of the handles 4 and 5 carry the respective rollers upon which the ink ribbon is mounted at either end.

1 is secured directly upon the main driving shaft 6 of the machine, upon which shaft are mounted the various cams for operating the different parts of the machine and which cams are all reciprocated as the shaft reciprocates under the operation of the handle. In practice, the operator seizes the handle 1 and pushes it backward to the limit of its movement, and then moves it forward again, or in case he fails to do this, wholly or in part, it is brought back with all of its connecting parts to its original position by means of a spring 49, shown in Fig. 2 secured at one end to a standard forming part of the frame-work, and at the other end secured to an arm 50 fast on shaft 6.

Before proceeding to describe further in detail the mechanism shown, and in order to make the explanation clearer, I will briefly describe the general operation of the machine.

After the operator has fully inserted the card in slot 3, he gives the handle 1 the reciprocating movement above described. Through various cams and connecting parts, this causes the entire operation of the machine. Among other things, it brings down upon the card the four sets of pins 106 and 169 of the two pin boxes 109 and 170. 109 is the hour pin box and is provided with two parallel rows each of twenty-four pins 106, one set in alinement with each of the two lines 212 shown on the card, Fig. 14, and pin box 170 is similarly provided with two parallel rows, each consisting of sixty pins, 169 in alinement with the two parallel lines 213 of the card when the latter is inserted in the slot. These pin boxes have an up and down reciprocating movement. Shortly after the main shaft starts in its initial movement, these pin boxes are moved downward through a cam mechanism, so that the pins are brought down upon the card. Each pin is arrested in this position by the card unless it happens to be in alinement with a punched hole 202, 203, 204 and 205. If in alinement with one of those holes, the pin projects through the card and through a hole in card-plate 22.

There will, therefore, at this juncture be four pins projecting through the four openings in the card and the corresponding holes in plate 22 and projecting slightly beneath the latter as shown in Fig. 13. These pins serve to stop devices, which in the present case are shown as selector blocks 121, 122, 123 and 124 and the location of such devices in their stopped positions controls the characters appearing on the printing type wheels which print the time shown on the card in Fig. 15.

Shortly after the beginning of the rotation of the main shaft, an impulse movement causes a carriage 63 to move backward along a guide rod 26. This carriage is detachably connected with each of the four selector blocks so that the carriage moves each selector block along until a projection, 72, from the selector block strikes one of the projecting pins. This causes the selector block to be detached from the carriage and to be locked in its set position. Each selector block is connected to one side of a differential gearing, the two hour selector blocks 121 and 122 being connected respectively by levers 129 and 78 and links 125 and 77 and their connecting parts to an hour differential shown in Figs. 6-10 upon opposite sides and so as to move their connecting parts of the differential in opposite directions in the usual way. Similarly the minute selector blocks 123 and 124 are connected by levers 127 and 131 respectively and their connecting parts to opposite sides of a minute differential constructed in all respects like the hour differential and shown at the right in Fig. 4. In the case of each differential, the resultant movement either one way or the other of the differential through suitable gearing moves the corresponding elapsed-time type wheel and through suitable gearing connected with the gears on the opposite sides of the differential the wheels for printing the hour and minute "in" and "out" time are operated in accordance with the extent of movement of the respective selector blocks.

These operations cause to be printed upon the card when the printing pressure devices are subsequently operated, the times for the "in" and "out" operation of the machine which produced the time marks on the card shown in Fig. 14, and also the elapsed time between the two operations of said machine.

As the main shaft rotates still further in its operation, by suitable cam mechanism, the printing pressure pads 23 (Figs. 2, 4 and 5) are brought into operative position to effect the printing.

All of the parts are then returned to their normal position by the backward movement of the main shaft 6 and operating handle 1, as already described.

I will now proceed to describe more in detail the different parts of the mechanism.

I will first describe the carriage and its impulse mechanism. It is specially illustrated in Figs. 3, 4, 5.

Carriage and connections.

142 is an arm fast on shaft 6 and having a curved projection 215. Arm 142, of course, turns with shaft 6. 141 is a rocking piece loose on shaft 6. It carries on its two arms and loosely pivoted to it two pawls 143 and 144, the first pivoted to it at 150 and the second pivoted to it at 151, each pawl is provided with a tail or end piece at each end, the pawl 143 having the two tail-pieces 149 and 146 and pawl 144 having the two tail-pieces 147 and 148. In the position of the parts shown in Fig. 3, the pawl 143 has been rocked on its pivot 150 slightly to the right so that tail 146 is projected inward and lies against the inner surface of extension 215 while the other end or tail 149 is thrown into the notch 44 in sector 145 secured to brackets 43 and 40 forming part of the frame-work of the machine. As arm 142 begins to rotate as soon as extension 215 passes the end of tail 146, it strikes tail 147 of pawl 144 and starts rocking piece 141 forward. This moves the end of pawl 143 from engagement with stud 42 on bracket 43 and thereupon spring 142$^a$ which is secured to the tail 149 of pawl 143 and tail 148 of pawl 144 causes pawl 143 to rotate to the left, bringing tail 146 immediately behind extension 215 of piece 142. The parts are thus locked firmly together. The movement of piece 141 is communicated to carriage 63 by means of link 61 secured to sleeve 140 to which rocking piece 141 is fastened and also through link 62 pivoted at the other end to link 61 and to carriage 63. The initial movement of rocking piece 141 thus causes carriage 63 to move toward the rear of the machine along guide rod 26. In order to insure the carriage remaining in an upright position, there is fastened to it an upright arm 64 which straddles at its lower end the guide rod 28.

Motion is transmitted from the carriage to each one of the selector blocks in the following manner:—

The selector blocks and their connections.

There are four selector blocks in the machine shown, 121 the hour in selector block, 122 the hour out selector block, 123 the minute in selector block, and 124 the minute out selector block. Each one of these is composed of a frame loosely and slidably mounted on two guide rods, block 121 sliding on rods 159 and 160, block 122 sliding on rods 79 and 80, block 123 sliding on rods 161 and 162, and block 124 sliding on rods 163 and 164.

For each selector block the carriage has a draw-bar 65, see Fig. 13. Connections are provided between each selector block and its corresponding draw-bar for connecting the selector block and the draw-bar at times, and for disconnecting them. As shown, these detachable connections are as follows: In Fig. 13 are shown the hour selector block for the "out" operation and its corresponding draw-bar 65. As all of the selector blocks are connected with their draw-bars in the same way, I will describe only the connections for the hour out selector block. 74 is a locking pawl for locking the selector block to the draw-bar. It is fulcrumed in the selector block at 216 and has a tail 76 which in the position of the parts shown in Fig. 13, takes into a corresponding notch cut toward the rear end of draw-bar 65. In this position of the parts, motion is communicated to the selector block 122 from the draw-bar by the rear wall of the notch pressing against tail 76 and forcing the selector block forward. The selector block is released by means of a trip-lever 72 fulcrumed at 216ᵃ in the selector block. Its upper part forms the trip finger adapted to engage with any pin of the corresponding set that happens to project downward through a hole in the card 108 and the corresponding hole in card-plate 22. Trip finger 72 is shown in Fig. 13 as about to engage such a depressed pin. When finger 72 strikes a pin the lever is rocked on its fulcrum and a pin 73 which projects sidewise from lever 72 and which lies normally opposite a projection 69 forming part of locking lever 74 rocks projection 69 and with it lever 74 to the left and withdraws tail 76 from the notch of draw-bar 65. The selector block immediately stops. It and its connecting parts are immediately locked in such position by the upper right-hand end of lever 74 entering into and engaging with a notch in a locking bar 166 (not shown in Fig. 13 but shown in cross-section in Fig. 5). There are four of these locking bars, one for each selector block, 165 for the in hour selector block, 166 for the out hour selector block, 167 for the in minute selector block and 168 for the out minute selector block. One of the these selector blocks, 122, is shown in side view in the section shown in Fig. 3. Each of the selector blocks is supported in the front and back frames 30 and 29 of the machine. The two hour locking bars are provided with twenty-four notches each, and each of the minute locking bars with sixty notches.

As the projection of lever 74 would only remain in engagement with the notch as long as tail 76 was pressed downward by the under surface of draw-bar 65 back of the notch, I preferably provide a secondary locking device for holding lever 74 in engagement with the notch. This is accomplished by a secondary lock 66 pivoted at 68 in the selector block and provided with an downwardly projecting notch into which projects a pin 75 projecting sidewise from draw-bar 65. Spring 67 connects the lever 74 with the secondary locking lever 66 and tends to pull the two toward each other. As draw-bar 65 separates from its selector block, pin 75 rocks secondary rocking lever 66 to the left and throws a V-shaped notch at the upper end of lever 66 into engagement with a V-shaped downward projection from lever 74. This locks lever 74 in the notch.

On the return of the draw-bar on the return movement of the carriage, pin 75 enters the slot or notch in locking lever 66, tilts that lever forcibly to the right, disengaging the V-shaped projection of 74 from the notch in lever 66, whereupon spring 67 immediately pulls locking lever 74 out of the notch. In the further return movement of the draw-bar 65, a downward projection from it, 217, strikes a knob 70 projecting from the side of the selector block and forces the selector block back to its original position.

*The pin boxes and connections.*

Figure 4:
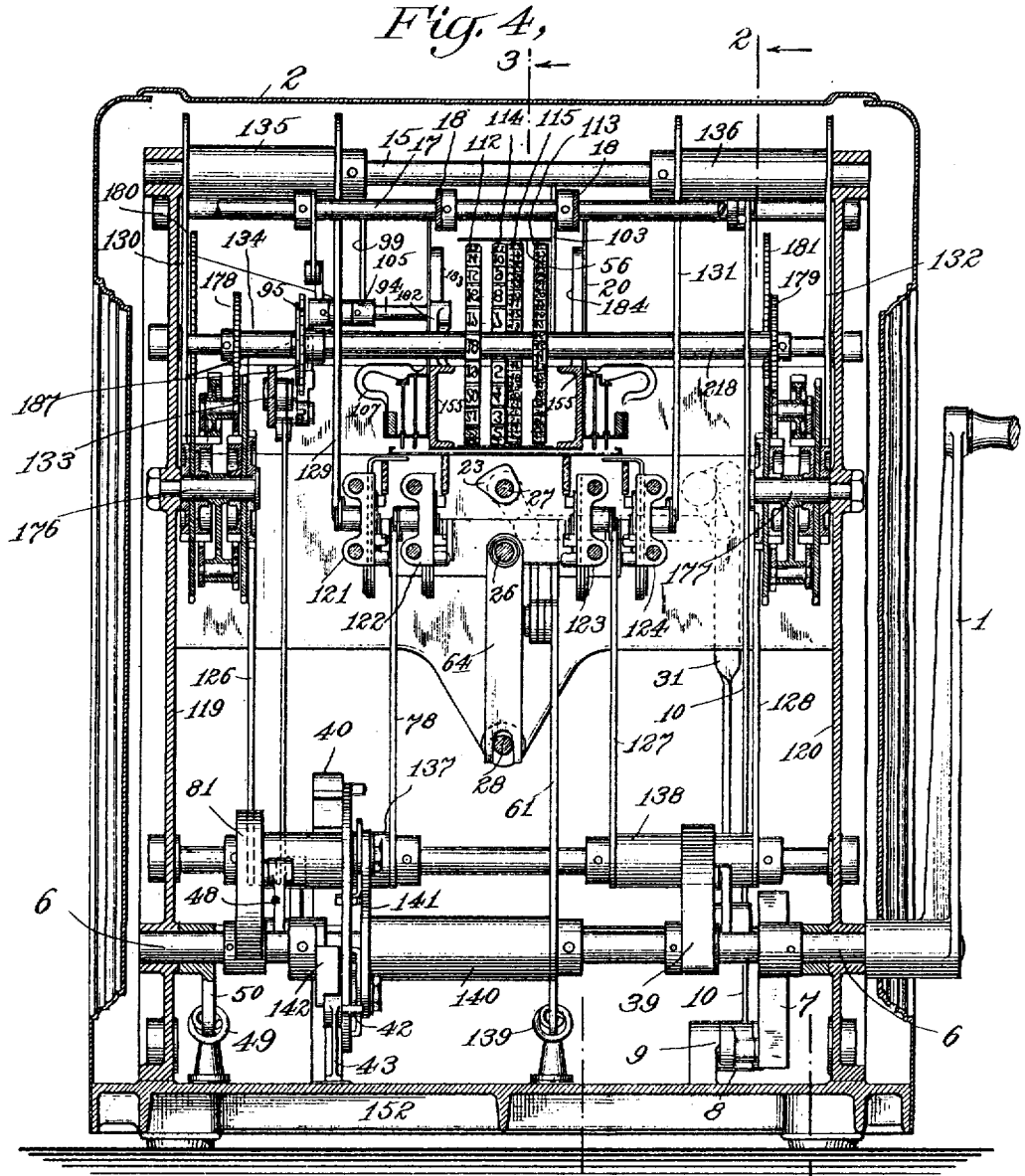
Fig. 4 is a vertical section of the machine taken at right angles to the above-named sections and just behind the front plate of the machine. This view shows the main shaft 6 with all of the cams and the impulse movement for the carriage, etc., in position.

Two pin boxes are provided, the hour pin box 109 and the minute pin box 170. Each of these boxes is provided with two parallel rows of pins, the hour box with two rows of pins 106, each row composed of 24 pins, the minute pin box 170 with two rows of pins 169, each row consisting of sixty pins. Each pin box is, as shown, made up of a light metal frame-work having an upper and lower projecting portions provided with holes in which are seated the pins and a vertical wall carrying the upper and lower portions and fitted so as to slide vertically on a casting 155. Vertical movement is imparted to each pin box up and down this casting and up and down an extension of the same, shown in Fig. 4, the extension on the hour side being numbered 183 and on the minute side 184. An upward lug 20 from each pin box also aids in guiding the pin box in its vertical movement along casting 155 and its extensions. The adjoining walls of the casting and its extension and the pin box and its lug are made smooth so as to move over each other readily. The means for giving the vertical movement to the pin boxes will be presently described. The castings 155 connect the two supporting members 29, 30 at the rear and front of the machine (Fig. 2) which supporting members connect and are supported by the two side frames, 119 and 120, of the machine (Fig. 4).

Fastened in each casting 155 is a rivet, 172 on the hour side and 171 on the minute, which rivets work in suitable vertical slots in the pin boxes 109 and 170 respectively and guide their vertical movement.

Figure 5:
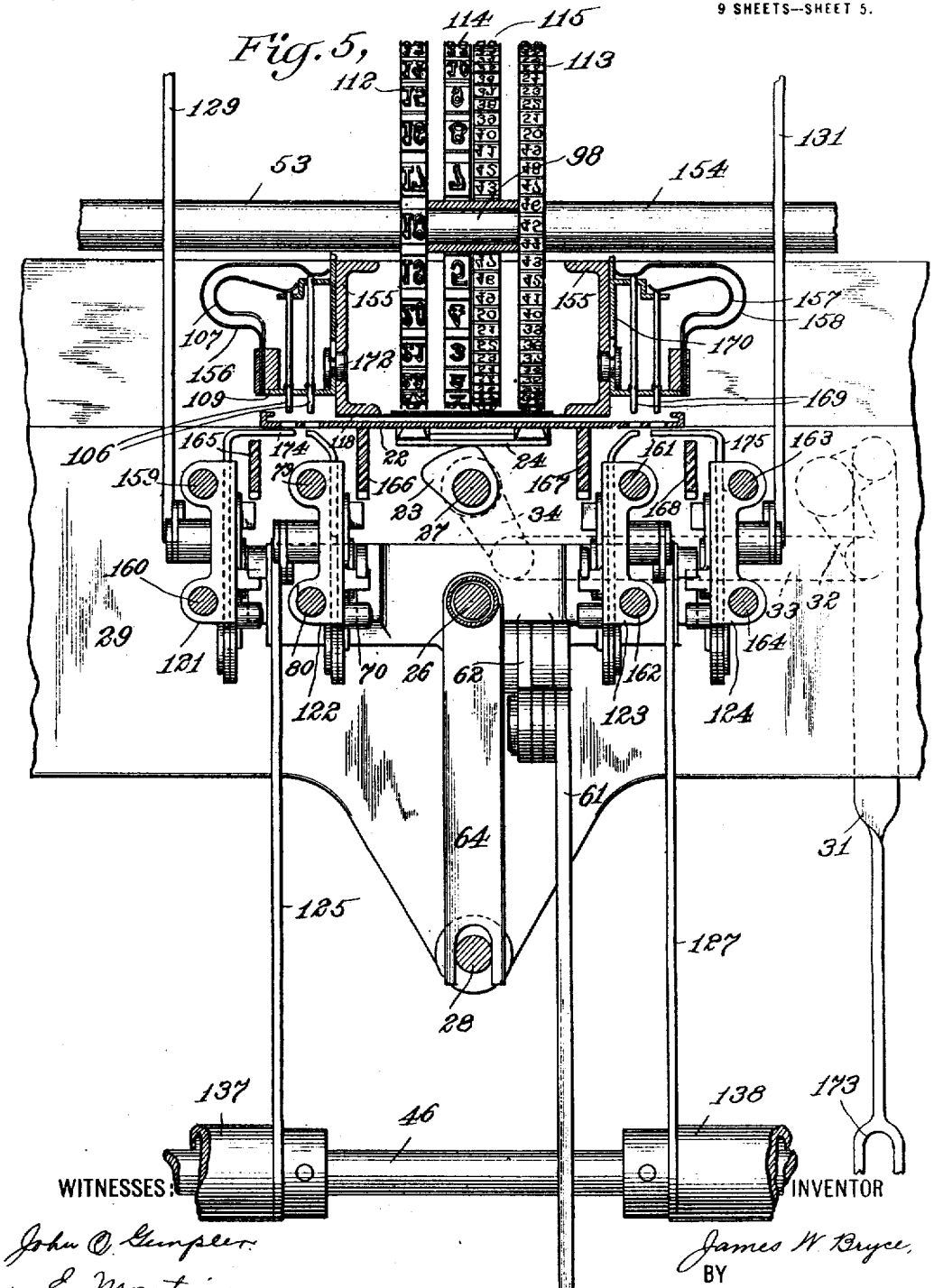
Fig. 5 is an enlarged view taken in the same direction and gives a vertical section through the carriage, selector blocks and pin boxes.
Figure 6:
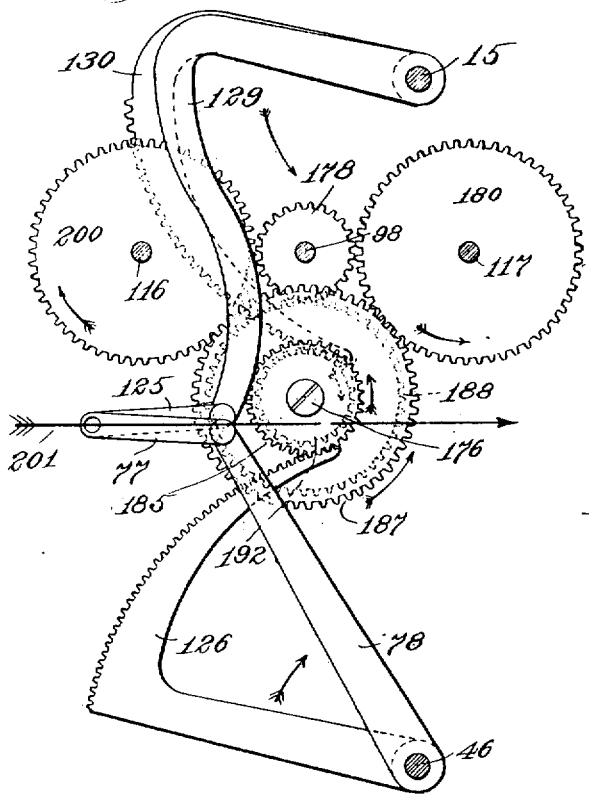
Fig. 6 is a semi-diagrammatic face view of the differential connected with the hour type wheels and Fig. 7 is a section through the hour differential.
Figure 7:
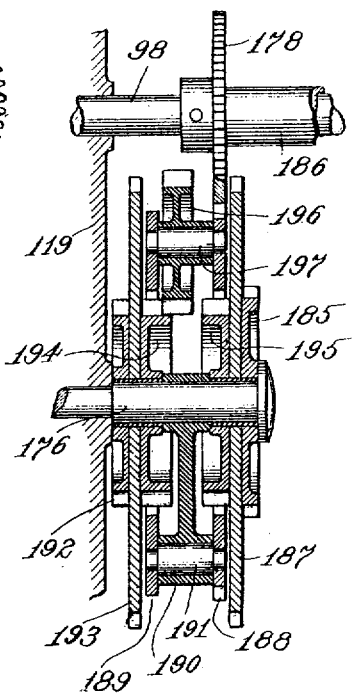
Figure 8:
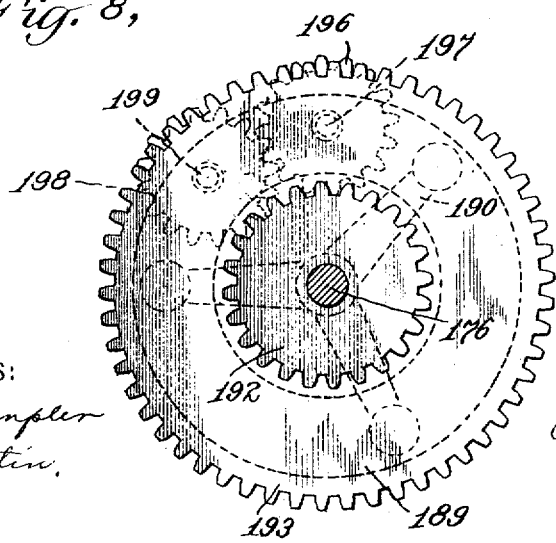
Fig. 8 is a rear view of the hour differential.

Fastened to the side of each pin box are two sets of springs which, as shown in Fig. 5, rest upon the tops of the pins and tend to depress them. On the hour side these sets of springs are numbered 156 and 107 and on the minute side are numbered 158 and 157. A punched-up lug on the lower part of each pin acts as a stop to prevent the pin from being depressed too far. The springs permit the pins to yield upward when they strike a card.

It will be seen that as the pin boxes descend those pins that are in alinement with a hole in the card will pass through and through a corresponding hole in the card-plate 22 and will project beneath the latter. All the other pins will be stopped by the card. The card is accurately guided to its position in the slot by the side walls of the card-plate 22 clearly shown in Fig. 5. The card is kept from rubbing against ink ribbon 56 by means of the shield-plate 118, which latter plate also prevents the card sticking to the pins in case the latter should happen to rub against the edges of any of the holes in the card.

The mechanism for forcing the pin boxes downward and upward are as follows: A cam 7 (Fig. 2) on main shaft 6 is provided with a cam-way in which runs a roller on the end of lever 8, the latter fulcrumed at 9 and having pivoted to its other end a link 10. Link 10 has pivoted to its upper end a crank-arm 11 fast to shaft 12 journaled in the side frames of the machine. Also fast to shaft 12 is a lever 13 connected by link 14 with a crank-arm 16 fast to shaft 17 which is a shaft exactly like shaft 12. Both shaft 12 and 17 have a pair of crank-arms 18. Those on shaft 12 are connected directly to the upward extensions on pin boxes at their inner ends. The two crank-arms 18 on shaft 17 are connected by means of the short connecting shaft 19 to the upwardly extending projections 20 of the pin boxes.

Figure 2:
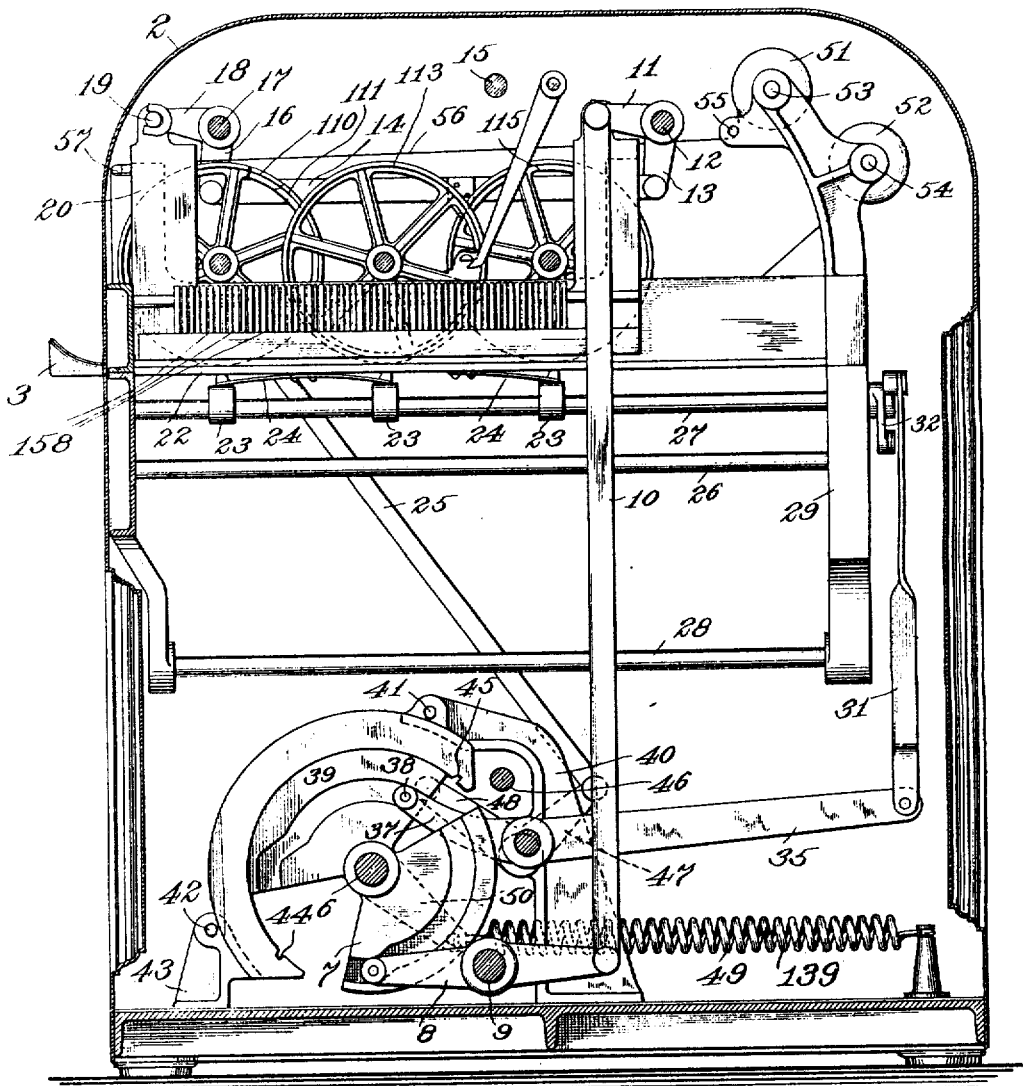
Fig. 2 is a vertical section of the machine taken at right angles to the front face and on the line 2—2 of Fig. 4 looking in the direction of the arrows.

Upon reference to Fig. 2 it will be seen that at the instant the machine starts into motion, the pin boxes will be forced downward and the pins be brought down upon the card in the manner already described.

From the above it will be seen that the extent of movement of each selector block will depend upon the location of the punched hole on the line on the card along which the selector block moves. This movement in each case will represent the extent of time of the corresponding operation of the machine which has punched the holes in the card, as for example those shown on Fig. 14. This distance is measured from the zero of time and on the card this would be represented by the beginning of the parallel lines 212 and 213 shown at the bottom of the card in Fig. 14. On this card, this time is represented in linear measurements. This is translated by the machine of the present application into a movement of gear wheels and type wheels to represent the time, or indicate the time, of the "in" and "out" operation in printed characters upon the card as shown at the top and bottom of the card of Fig. 15, and the difference in extent of movement between the hour "in" selector block and the hour "out" selector block and the difference between the movement of the "in" minute selector block and the "out" minute selector block, is in each case translated into a corresponding movement of a differential and through it to the corresponding movement of an elapsed-time type wheel. This difference in linear measurement between the two hour punched holes, 202, 203, measured along one of the parallel lines 212, is thus translated into the number of hours with which it corresponds and the said number is printed on the card as shown in Fig. 15 where it is represented by the number "2." Similarly the linear distance or measurement between hole 204 and 205 on the minute side is translated and printed as "28 min." It will, of course, be understood that, where an "out" hole in the card is nearer the zero line than the corresponding "in" hole, the linear distance between the two holes, representing the elapsed time between the two operations they represent, is that measured from the "in" hole to the end of the parallel lines at the top of the card plus the distance from the beginning or zero point of those lines near the bottom of the card to the "out" hole. The direct distance between the two holes is, of course, in such a case the complement of the said linear distance which represent the true elapsed time. In such a case the corresponding differential will, of course, rotate in the opposite direction to that it would rotate were the "in" hole nearer the zero point on the card than the "out" hole. And it will rotate an amount represented by said linear complement. This, in effect, subtracts the time value represented by said complement from the zero on the corresponding elapsed time type-wheel and this is, of course, the equivalent of rotating said type-wheel in the other direction on amount representing the true elapsed time between the two operations represented by said two holes.

I will now proceed to describe the means by which these times in linear measurement are, through the operation of the selector blocks, translated into the appropriate figures through the movement of type wheels and a differential.

*The differential gear and connections.*

The differential gear referred to is shown in Figs. 6, 7, 8, 9 and 10 in particular and in general also in Fig. 4. Motion is communicated to each differential preferably in a reverse direction by its corresponding selector blocks. For example, the differential gearing shown at the left in Fig. 4 which is the hour differential is connected on one side through sector 130, sleeve 135 loose on shaft 15, and lever 129 and link 125 with the hour "in" selector block 121. The same differential is connected on its other side by sector 126, sleeve 137 on shaft 46 and lever 78 and link 77 with the hour "out" selector block 122. The minute differential shown on the right-hand side of Fig. 4 is thus similarly connected on one side with minute "in" selector block 123 and on the other side with minute "out" selector block 124. In each case one selector block moves one side of the differential in one direction and the other selector block moves the other side of the differential in the reverse direction. The resultant movement of the differential one way or another represents the elapsed time between the two punched holes in the card, and this movement is imparted through suitable gearing to the corresponding elapsed-time type wheel. For example, the resultant movement of the hour differential is communicated through gear 178 to the hour elapsed-time type wheel 112 and the resultant movement of the minute differential is communicated through gear 179 to the minute elapsed-time type wheel 113.

The movement of the hour "in" selector block 121, which represents the starting time in hours is at the same time, through gear 193, connected with the differential to the "in" hour type wheel 114, and the extent of movement of the selector block 122, which represents the time of the second or "out" operation represented by punched hole 203 on Fig. 14, is communicated to the "out" hour time type wheel 110 through gear 187 on the opposite side of the hour differential. In a similar manner the appropriate movement is communicated to the minute type wheel representing the time of the "in" operation of the machine, 115, and to the "out" minute time type wheel from appropriate gears on opposite sides of the minute differential.

I will now proceed to describe this mechanism in greater detail.

Figs. 6, 7, 8, 9 and 10 are views of the hour differential. It will be understood, of course, that the minute differential is constructed exactly the same only with the parts facing the other way. 176 is the central stud of the hour differential which is secured to the side frame 119. Upon this stud are mounted the gears composing the differential or connected with it. Meshing with a gear 192 is a sector 130 secured to a sleeve 135 loose on shaft 15. An arm 129 fast on the sleeve is connected by link 125 to the selector block 121. Fast with gear 192 is a large gear 193 and a smaller gear 194. Gear 193 transmits movement to the "in" hour type wheel 114 through gear 180 and shaft 117 upon which is fast the "in" hour type wheel 114.

The small gear 194 is a part of the differential gear proper. Also loosely mounted on stud 176 is the supporting member 190. It is provided with three arms radiating from the central hub, each arm drilled near its outer end for the reception of the pin 191. The three pins 191 are riveted into the ring 189 on one side and into the ring-gear 188 on the other, so that all three form part of one structure and rotate together on the common stud 176. Also riveted into the rings 188 and 189 are the centers or studs for the two floating gears of the differential, 197 and 199. On these studs are mounted loosely pinions 196 and 198 which are in mesh with each other. The pinion 196 is also in mesh with the gear 194, while the pinion 198 is in mesh with gear 195. Gears 195, 185 and large gear 187 are secured together and are mounted loosely on stud 176. Gear 185 meshes with sector 126 fast on sleeve 137 loose on shaft 46, which sleeve also carries arm 78 and this through link 77 is connected with the hour "out" selector block 122.

Gear 187 turns the hour "out" type wheel 110 through gear 200 fast on the shaft 116 of the hour "out" type wheel. The extent of movement of the hour "out" type wheel is thus dependent upon the extent of movement of the hour "out" selector block 122.

It will, of course, be understood that the gears 194 and 195 on the opposite sides of the differential, being moved in reverse direction according to the respective extents of movement of the hour selector blocks 121 and 122, will cause the rings 189 and 188 and the supporting member 190 to move a distance equal to the difference between the respective movements of the two selector blocks, a distance, of course, representing the elapsed time between the two operations which the movements of the selector blocks represent. This movement is transmitted to the hour elapsed-time type wheel 112 from gear 188 through a gear 178 fast on sleeve 186 to which the said type wheel is also secured. As the resultant movement of the differential is, of course, only one-half that of the actual difference between the two movements of the selector blocks, it is necessary to compensate for this by making the gear 178 one-half the size of the gear 188 in the usual way.

The result of the above operations is to bring upon the printing line the hour "in" type wheel and the hour "out" type wheel in such a manner as to bring the hour of the "in" or first operation of the machine and the hour of the "out" or second operation of the machine upon the printing line for the "in" and "out" operations respectively as illustrated in Fig. 15, and also to move the hour elapsed-time type wheel to bring the proper elapsed hour upon the printing line of the elapsed time as shown in Fig. 15.

As shown in Fig. 15, the "in" time printed at the top of the card is "9 08," which represents the time measured in units of linear measure, represented by the "in" hour and minute holes 202 and 204 on Fig. 14. Similarly, the "out" time printed at the bottom of the card in Fig. 15 is "11 36," which is the time represented by the "out" hour and minute holes 203 and 205 of the card shown in Fig. 14.

Similarly, the elapsed time printed on the card at Fig. 15 near the middle of the card is 2 hours and 28 minutes, which represents the elapsed time represented by the linear distance between the hour and minute "in" and "out" holes of the card at Fig. 14, measured along one of the parallel lines of that card.

The construction and operation of the minute differential and its connections with the minute selector blocks and with the minute type wheels are identical with those of the hour differential and its connections, and therefore need not be further explained except to say that "in" minute selector block 123 is connected with one side of the differential through a link, not shown but just like link, 77, on the hour side; also by arm 127, sleeve 138, loose on shaft 46 and sector 128, and minute "out" selector block 124 is connected with the other side of the minute differential by means of a link, not shown but just like link, 125, on the hour side, arm 131, fast on sleeve 136, loose on shaft 15, and sector 132, meshing with the other side of the minute differential; and the minute elapsed type wheel is driven from the gear 188 of the minute differential through gear 179 on the sleeve 218 of the minute elapsed type wheel 113; also that the minute "in" type wheel is driven from gear 193 connected with the minute differential through gear 181, which is fast on the sleeve carrying the minute "in" type wheel 115; and the minute "out" type wheel 111 is driven from gear 187 of the minute differential through a gear, not shown, fast on the sleeve of the said minute "out" type wheel.

It is also obvious that instead of causing the movements of each differential to be in opposite directions in accordance with the values represented by its time devices respectively, the two movements of the differential might be in the same direction provided that in such case one of said movements was the complement in extent of the true value represented by one of the time devices.

In case the "out" selector minute block is stopped by a pin before the "in" minute selector block is stopped, it will be seen that the resultant movement of the differential and therefore of the minute elapsed-time type wheel will be backward and not forward, and it will be understood, of course, that in such a case it will be necessary to subtract one unit from the extent of movement of the elapsed-time type wheel on the hour side. Any suitable mechanism for subtracting one from such movement of the said wheel can be employed. I will now proceed to describe my preferred mechanism, which is that shown in the drawings.

In the particular machine shown in the drawings each differential is operated by its selector blocks which are controlled by the time devices. My invention, however, is, of course, not limited to such a construction or connection. The differential may be operated by any suitable means, and either automatically or manually, as long as such operation is controlled or limited by the time devices.

*Subtractor mechanism.*

This mechanism is particularly shown in detail in Figs. 2, 4, 11 and 12. Fast on shaft 6 is a cam 81, having a cam path in which travels a roller 82 on the end of arm 48, fast on a stud shaft 219. Also fast on this shaft is another arm 47, carrying at its end and pivoted to it a link 25, which at its other end is pivoted to an arm 83, fast on a stud shaft 84. Also fastened on this same shaft is an arm 85, carrying at its end a spring-held pawl 90, pivoted at 87 and provided with a spring 86 and a stop arm 89 and a stop 88. At every operation of the machine the pawl 90 is raised and lowered. 95 is a ratchet wheel connected with the hour elapsed-time type wheel, as will be presently described, and adapted to turn that wheel backward one point or unit whenever the pawl 90 engages with it. Normally pawl 90 is prevented from engaging with it by means of the shield 97, fast on shaft 94; but whenever it becomes necessary to subtract one from the hour elapsed-time type wheel, as in the case set forth above, shield 97 is withdrawn from its shielding or protecting position, by means presently to be described, and in that case pawl 90 as it rises turns ratchet wheel 95 backward one point or unit, thus subtracting one from the hour elapsed-time type wheel.

The detailed mechanism by which this is accomplished will now be described. 100 is a shaft mounted in the side frames of the machine, carrying a lever arm 103, the end of which is mounted directly in the path of a pin 104 secured to the side of the minute elapsed-time type wheel 113. In the normal position of the parts pin 104 rests against the end of lever arm 103. If the minute elapsed-time type wheel turns forward, as it does in the illustration given in Figs. 14 and 15, pin 104 will move away from lever 103 without affecting that lever in any way, and on its return will simply be brought back in contact with it and without disturbing it. If, however, the minute elapsed-time type wheel is moved by the differential backward instead of forward, in which case, as already described, it will be necessary to subtract one from the elapsed time in hours, pin 104 will rock lever 103 slightly toward the right, as viewed in Fig. 12, and will rock in the same direction lever arm 99, which is also fast on shaft 100. 105 is a projecting arm with a notch in its end, in which notch the end of lever arm 99 normally rests. Arm 105 is fast to shaft 94. Levers 103 and 99 are held in their normal positions against pin 104 and hook 105 respectively by means of a spring 101, fast to arm 102, secured to shaft 100. Shield 97 is also fast on shaft 94. A spring 91, fastened to the framework and to shield 97, tends to pull the shield out of its protecting position. This tendency is normally counteracted by arm 99 locking shaft 94 from rotation by means of the hook 105. Whenever, however, pin 104 rocks the levers 103 and 99, as described, shaft 94 is unlocked and shield 97 moved by spring 91 from its protecting position. This is accomplished, of course, immediately after the elapsed-time type wheels have been moved to their said position. Immediately after this, cam 81 causes pawl 90 to operate, and in the position of the parts just described this pawl will move ratchet 95 one point backward.

This motion is communicated to the elapsed-time type wheel as follows. Ratchet wheel 95 is loosely mounted on the shaft 98 of the elapsed-time type wheel 112, and is connected by means of sleeve 53 with the wheel 112 (see Fig. 5). 187 is a disk mounted on shaft 98 (see Fig. 4) close to the ratchet wheel 95. It is connected to pinion 178, which is in gear with the differential as described above. A spiral torsion spring 134 is connected at one end with gear 178 and at the other end with ratchet wheel 95. Two rivets 96 are provided, projecting from ratchet 95 and projecting into slots in the disk 187. These slots are just long enough to allow the ratchet wheel to turn one-twenty-fourth of a revolution. Relative to the gear 187, from the description which I have given above it will be seen that when the minute elapsed-time type wheel turns backward, one will be subtracted from the hour elapsed-time type wheel. This operation takes place immediately after the type wheels have been moved to their respective set positions by means of the selector blocks and differential. The printing immediately follows this operation, whereupon all the parts are returned to their normal positions by means of the various cams on the cam shaft and their connecting parts. The shield 97 is returned to its normal position by means of a cam 92 mounted on link 14, striking a cam-shaped projection 93 from shaft 94. It will be remembered that link 14 was described in connection with the devices for forcing the pins down upon the card. In the return movement of link 14 the cam 92 restores shield 97 to its original position, as just described.

Any suitable mechanism may be employed for effecting the printing by the various type wheels. As shown, I accomplish this by means of a rod 27 (see Figs. 2 and 4) on which are mounted three pressure cams 23. Resting upon these cams are the pressure printing pads which are shown as mounted on the end of flat springs 24, secured to the under side of the card frame 22. The rod 27 is journaled in the two end frames 29 and 30. A lever arm 34 is secured to the end of the rod 27 (see also Fig. 5) and is connected with the bell crank 32 by means of the link 33. On the opposite end of the bell crank is the link 31. The lower end of this link is slit at 173 to straddle the lever arm 35. The latter lever is pivoted on the casting 40 at 36 and this lever at the end of its other arm 37 carries a roller 38, traveling in a cam groove in the cam 39. As shown in Fig. 2, the printing occurs the last thing in the cycle of operations on the forward stroke or operation of the machine. After this occurs cams 23 will be rocked to the right, as shown in Fig. 5, and will press the printing pads against the card, ink ribbon, and type wheels, and take an impression of the type which stands opposite them on the printing line.

In case the operator does not return handle 1 to its original forward position, I provide a strong spring 49 secured to an arm 50 fast on shaft 6 to effect this end. I also preferably provide spring 139 (Fig. 3) secured to the lower end of lever 61 to aid in the return of the carriage to its original position.

Figure 3:
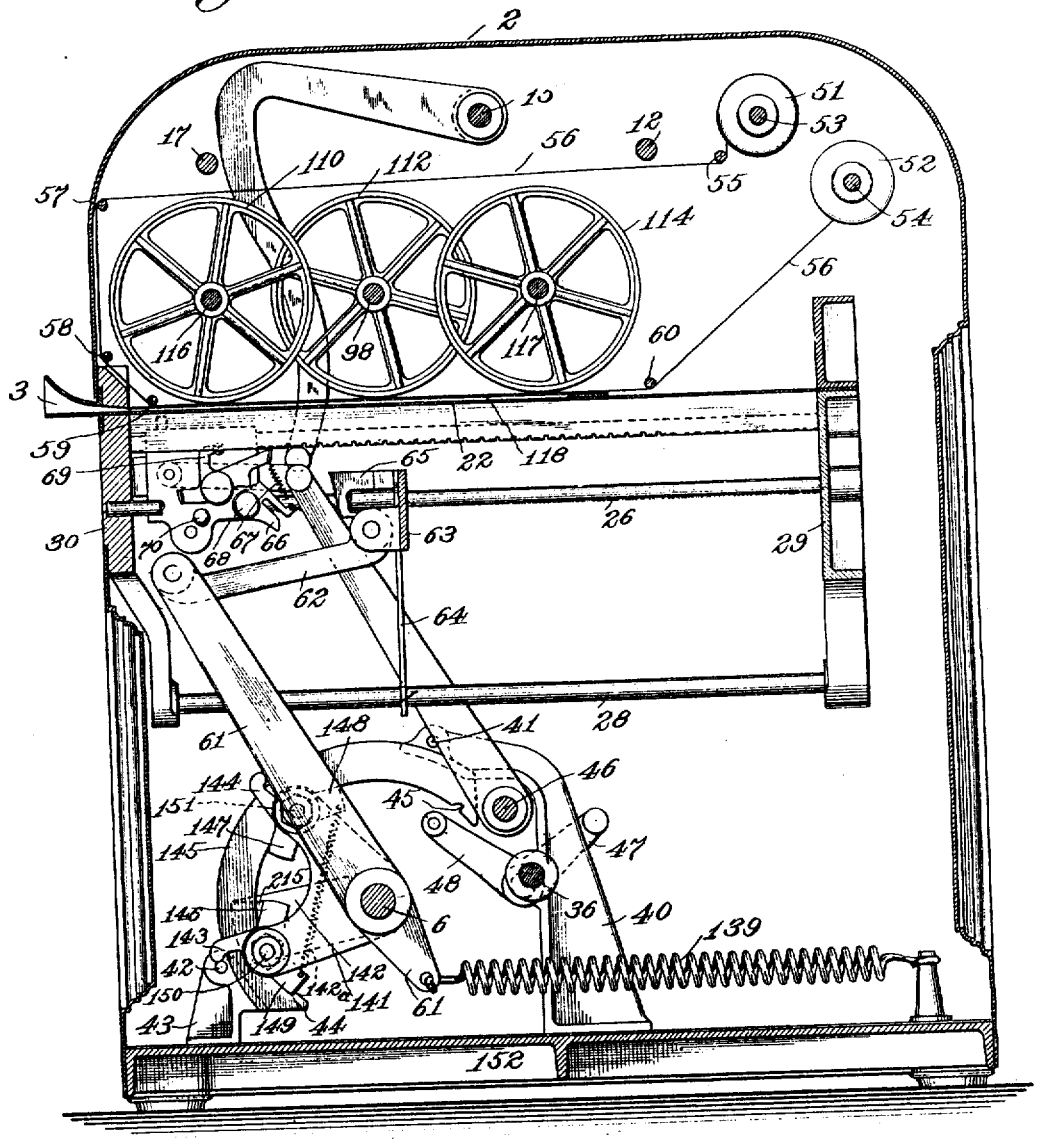
Fig. 3 is a similar section taken on the line 3—3 of Fig. 4.

Any suitable device may be used for operating and reversing the ink ribbon. As this forms no part of my invention I have simply shown a manual feed operation, which is illustrated at Figs. 2 and 3. 51 and 52 are the two rollers which carry the ink ribbon 56, which are mounted respectively on shafts 53 and 54, upon the ends of which outside of the casing are mounted handles 5 and 4. The ink ribbon runs from one roller to the other around various guide rods 55, 57, 58, 59, and 60, and between the various type wheels and the shield plate 118, which protects the card and the ink ribbon from each other. It will of course be understood that this shield at the proper printing points is provided with openings to permit the pressure of the pads to force the card and ink ribbon together against the type.

Many modifications or changes in, additions to or subtractions from, the particular devices shown in the annexed drawings and described herein, other than those that have been already specifically referred to above, may, of course, be made without departing from my invention.

What I claim as new and desire to secure by Letters Patent is:—

1. The combination of indicating mechanism capable of movement in either direction, a card provided with two marks representing different data, and two actuating devices controlled by the marks on the card and themselves controlling the movement of the indicating mechanism in accordance with the value of the said data, one controlling the movement of the indicating mechanism in one direction and the other controlling it in the other direction, whereby the resultant movement of the indicating mechanism will represent or indicate the difference in value between the said two data.

2. The combination of indicating mechanism capable of movement in either direction, a card provided with two holes representing different data, and two actuating devices controlled by the holes on the card and themselves controlling the movement of the indicating mechanism in accordance with the value of the said data, one controlling the movement of the indicating mechanism in one direction and the other controlling it in the other direction, whereby the resultant movement of the indicating mechanism will represent or indicate the difference in value between the said two data.

3. The combination of elapsed time indicating mechanism capable of being moved in either one of two directions, one in an adding direction and the other in a subtracting direction, a card provided with two time marks, and two actuating devices, each device adapted to be controlled in its movement by one of the time marks on the card, one actuating device adapted, if operating alone, to move the elapsed time indicating mechanism in the adding direction a distance representing the time represented by its time mark and the other actuating device adapted, if operating alone, to move the indicating mechanism in the subtracting direction a distance representing the time represented by its time mark, and both actuating devices together causing the elapsed time indicating mechanism to move in a direction and for a distance corresponding to the resultant between the two different times represented by the two time marks on the card.

4. The combination of elapsed time indicating mechanism capable of being moved in either one of two directions, an adding direction or a subtracting direction, a card provided with two time marks, one mark representing the time of a first or "in" operation, the other mark the time of a second or "out" operation, and two actuating devices controlled in their movements respectively by the time marks on the card, one actuating device adapted, when operating alone, to move the elapsed time indicating mechanism in an adding direction a distance representing the time represented by its time mark, and the other actuating device adapted to move the indicating mechanism, if operating alone, in a subtracting direction a distance representing the time represented by its time mark, and both actuating devices together causing the elapsed time indicating mechanism to indicate the resultant or elapsed time between the said two operations.

5. The combination of elapsed time indicating mechanism, capable of being moved in either one of two directions, one an adding direction and the other a subtracting direction, a card provided with two holes, one hole representing the time of a first or "in" operation and the other hole the time of a second or "out" operation, and two devices, each device adapted to be controlled by one of the holes in the card and tending, when operating alone, to move the elapsed time indicating mechanism, one in an adding direction and the other in a subtracting direction, an amount representing the time represented by its hole in the card, and both devices together causing the elapsed time indicating mechanism to move in a direction and for a distance corresponding to the resultant between the times represented by the two holes.

6. The combination of indicating mechanism, a differential device for actuating such mechanism, an actuating device for moving the differential device in an adding direction itself adapted to have a predetermined amount of travel unless sooner stopped by a device representing the data of an operation of the machine, another actuating device for moving the differential device in a subtracting direction itself adapted to have a predetermined amount of travel unless sooner stopped by a device representing the data of a second operation of the machine, manually operated means for giving to the actuating devices their predetermined amount of travel unless sooner stopped by a data device, and a device representing the data of a first operation adapted to be in register with one of the actuating devices at some point of its travel and to stop the said device at such point, and another device representing the data of a second operation and adapted to be in register with the other actuating device at some point of its travel and to stop it at such point, whereby the resultant movement of the differential will cause the indicating mechanism to indicate the difference between the two operations represented by the data devices.

7. The combination of a card provided with a hole representing, by its location on the card, a certain value, an actuating device adapted to travel across the card and to be stopped in its travel by such hole when in register therewith, means for giving said device a predetermined amount of travel across the card, unless sooner stopped by such hole in the card, whereby the said actuating device will be stopped in its movement by such hole when opposite to or in register therewith, and its movement up to such point will represent the same value as represented by the hole, and an indicating mechanism moved by said actuating device so as to present an indication in accordance with the extent of travel of such device.

8. In a machine for indicating the difference in time between two operations, the combination of a differential device, two time devices, one of them representing the time of the first operation and the other the time of the second operation, and connections between the time devices and the differential device for moving the latter in different directions according to the time represented by said time devices respectively.

9. The combination of elapsed time indicating mechanism, a differential device for actuating the indicating mechanism, two time devices, one representing the time of a first operation and the other the time of a second operation, and two actuating devices, one for each time device, and each adapted to be controlled by its respective time device and each connected with the differential device so as to move the later in the opposite direction to that in which the other actuating device moves it, whereby the elapsed time indicating mechanism will be caused to indicate the elapsed time between the two operations.

10. The combination of indicating mechanism, a differential device for actuating the same, a card provided with two marks representing different data, and two devices, each device adapted to be controlled by one of the marks on the card and connected with the differential device so as to move it in the opposite way to that in which the other moves it, whereby the indicating mechanism will be caused to indicate the difference between the data represented by the said two marks on the card.

11. The combination of elapsed time indicating mechanism, a differential device for actuating the same, a card provided with two time marks, and two devices, each device adapted to be controlled by one of the time identification marks on the card and connected with the differential device so as to move it in the opposite way to that in which the other moves it, whereby the elapsed time indicating mechanism will be caused to indicate the difference between the two times represented by the said two identification marks on the card.

12. The combination of elapsed time indicating mechanism, a differential device for actuating the same, a card provided with two time marks, and two devices, each device adapted to be controlled by one of the time marks on the card, one mark on the card representing the time of a first or "in" operation and the other mark the time of a second or "out" operation, and each device connected with the differential device so as to move it in the opposite way to that in which the other moves it, whereby the elapsed time indicating mechanism will be caused to indicate the elapsed time between the said two operations.

13. The combination of elapsed time indicating mechanism, a differential device for actuating the same, a card provided with two time holes, two devices, each device adapted to be controlled by one of the time holes in the card and each actuating device connected with the differential device so as to move it in the opposite direction to that in which the other device moves it, whereby the elapsed time indicating mechanism will be caused to indicated the elapsed time between the two times represented by the said two time marks.

14. The combination of a card provided with a hole representing, by its location on the card, a certain value, a device adapted to travel across the card and to be stopped in its travel by such hole when in registry therewith, an indicating device connected with and adapted to be controlled by the said traveling device in accordance with the extent of travel of the latter, and means for giving said traveling device a predetermined amount of travel across the card unless sooner stopped by such a hole in the card, whereby the indication of the indicating device will be in accordance with the location of such hole on the card.

15. The combination of a time differential device, actuating means for moving it one way, having a predetermined amount of travel unless positively stopped, a time device representing the time of a first or starting operation, adapted to limit the movement of the said actuating means in accordance with the time represented by the time device, actuating means for moving the differential device the other way, having a predetermined amount of travel unless positively stopped, and a time device representing the time of a second or finishing operation, adapted to limit the movement of the last-mentioned actuating means in accordance with the time represented by said time device, the combined movements moving the differential so that its resultant position will represent the elapsed time between the two operations.

16. The combination of elapsed time indicating mechanism, differential device for actuating it, actuating devices, connected with the differential device, one identifying device for moving the device one way, and the other actuating device for moving the device the other way, means actuated by the operation of the machine for moving the actuating devices, and stops for such movement, whereby the elapsed time indicating mechanism will indicate the difference in time represented by the difference in the relative movements of the actuating devices.

17. The combination of elapsed time indicating mechanism, differential gearing for actuating it, a card provided with time marks, actuating devices connected with the differential gearing, one actuating device for moving the gearing one way and the other actuating device for moving the gearing the other way, means actuated by the operation of the machine for moving the actuating devices over the card, and stops, controlled by the time marks on the card for stopping such movement, whereby the elapsed time indicating mechanism will indicate the difference in time represented by the difference in the relative location of the marks on the card.

18. The combination of differential device, two actuating devices connected respectively to opposite sides of the differential device and adapted to move it in different directions, a card provided with time marks, a reciprocating carriage for moving the actuating devices, detachable connections between the carriage and each actuating device, stops for actuating the detachable connections adapted to be controlled by the time marks on the card to separate the actuating devices from the carriage, one mark on the card representing the time of a first or starting operation and the other the time of a second or finishing operation, elapsed time indicating mechanism, and connections between the differential device and the elapsed time indicating mechanism to impart a movement from the differential device to the elapsed time indicating mechanism proportionate to the difference between the opposite movements of the differential device.

19. The combination of differential gearing, two actuating devices connected respectively to opposite sides of the differential gearing and adapted to move it in different directions, a card provided with time holes, a reciprocating carriage for moving the actuating devices, detachable connections between the carriage and each actuating device, two sets of pins adapted to be brought against the card, one set in alinement with one of the time holes in the card representing the time of a starting or first operation and the other set in alinement with another time hole in the card representing the time of a second or finishing operation, and each pin projecting through one of said holes adapted to detach the actuating device from the carriage, elapsed time indicating mechanism, and connections between the differential gearing and the elapsed time indicating mechanism to impart a movement to the latter proportionate to the difference between the opposite movement of the differential gearing.

20. The combination of two differential gears, one for the hours and another for the minutes, two actuating devices for each differential gear connected respectively to opposite sides of said gear and adapted to move it in different directions, a card provided with hour holes and minute identification holes, a reciprocating carriage for moving all of the actuating devices, detachable connections between the carriage and each actuating device, four sets of pins adapted to be brought against the card, one set representing the hours and adapted to be brought into contact with the card in alinement with one of the hour time holes in the card representing the hour of a first or starting operation, another set representing the minutes and adapted to be brought into alinement with one of the minute time holes in the card representing the minute of the first or starting operation, another set representing the hours and adapted to be brought into contact with the card in alinement with another hour hole in the card representing the hour of a second or finishing operation, and the other set representing the minutes adapted to be brought into contact with the card in alinement with another minute hole in the card representing the minute of the second or finishing operation, each pin passing through a hole adapted to detach its actuating device from the carriage, elapsed time indicating mechanisms representing the time in hours and minutes, and connections between each differential gear and its corresponding elapsed time indicating mechanism to impart movement from the differential gear to the indicating mechanism proportionate to the difference between the opposite movement of said differential gear, whereby the indicating mechanisms will indicate the elapsed time in hours and minutes between two operations.

21. The combination of indicating mechanism capable of movement in either direction, a card provided with two marks representing different data, and two actuating devices each adapted to move across the card in line with one of the marks and to be controlled by said mark in its actuation of the indicating mechanism in one direction, one of the actuating devices controlling the movement of the indicating mechanism in one direction and the other in the other direction, whereby the resultant movement of the indicating mechanism will represent or indicate the difference in value between the said two data.

22. The combination of indicating mechanism capable of movement in either direction, a card provided with two holes representing different data, and two actuating devices each adapted to move across the card in line with one of the holes and to be controlled by said hole in its actuation of the indicating mechanism in one direction, one of the actuating devices controlling the movement of the indicating mechanism in one direction and the other in the other direction, whereby the resultant movement of the indicating mechanism will represent or indicate the difference in value between the said two data.

23. The combination of a card provided with two holes each representing, by its location on the card, a certain value, two actuating devices each adapted to travel relatively to the card until in register with one of the holes, means for causing a fixed or predetermined amount of such relative travel between the card and each actuating device unless sooner ended by the registry of such actuating device and its hole, and an indicating mechanism adapted to be moved in different directions by said actuating devices in accordance with the values represented by said holes to indicate the difference between such values.

24. The combination of two time indicating mechanisms, a card provided with time marks, two actuating devices, each device adapted to be controlled by one of the time marks on the card, one mark representing the time of a first or "in" operation, and the other mark the time of a second or "out" operation, and connections between each actuating device and its indicating mechanism for imparting movement from the former to the latter, and printing devices, whereby the time of the first or "in" operation and the time of the second or "out" operation will be printed upon the card.

25. The combination of elapsed time indicating mechanism, an actuating device adapted to affect the extent of operation of the indicating mechanism, a card provided with a time hole representing the absolute time of an operation, a set of time pins representing different points of time and adapted to be brought against the card in alinement with the time hole and one of said pins adapted to project through said hole into the path of the actuating device to control the latter, connections between the actuating device and the elapsed time indicating mechanism, and printing devices, whereby the absolute time represented by the time hole in the card will be printed upon the card.

26. In an elapsed time indicating machine, the combination of elapsed time indicating mechanism, adapted to move either in an adding or in a subtracting direction, a card provided with time marks, and two actuating devices, each adapted to be controlled by one of the time marks on the card, one of said marks representing the time of a first or "in" operation and the other mark representing the time of a second or "out" operation, and connections between each actuating device and the indicating mechanism for moving the latter, one in an adding direction and the other in a subtracting direction, whereby the actuating devices will affect the extent of operation of the elapsed time indicating mechanism in accordance with the times of such operations.

27. In an indicating machine, the combination of indicating mechanism, two sets of stops, said sets comprising a plurality of pins for each denominational order, said pins being adapted to be controlled by a plurality of separate marks on a card for a single denominational order for affecting the operation of the indicating mechanism.

28. In an elapsed time indicating machine, the combination of two sets of time stops, each set consisting of two series of pins, two sets of time devices, one set for each set of time stops, each set of devices composed of an identification device representing the time of a first or starting operation and another time device representing the time of a second or finishing operation, and two sets of actuating devices, adapted to be operated by the time stops, each set of actuating devices composed of an actuating device for the starting time and another for the finishing time.

29. The combination of elapsed time indicating mechanism for indicating the hours of elapsed time and elapsed time indicating mechanism for indicating the minutes of elapsed time, a differential gear for each elapsed time indicating mechanism, two sets of actuating devices, one set composed of an actuating device adapted to be controlled by an hour time mark on a card representing the hour of a first operation, and an actuating device controlled by an hour time mark on the card representing a second operation, and the other set of actuating devices consisting of two actuating devices, one adapted to be controlled by a minute time mark on the card representing the minute of the first operation, and the other actuating device adapted to be controlled by a minute time mark on the card representing the minute of the second operation, connections between the actuating devices of each set and the corresponding differential gear, and connections between each differential gear and its corresponding elapsed time indicating mechanism, whereby the elapsed time in hours and minutes between the two operations will be indicated by the elapsed time indicating mechanism.

30. The combination of two differential gears, one for one division of time and the other for another division of time, two actuating devices for each differential gear, one connected to one side of the gear and adapted to move it one way, and the other connected to the other side of the gear and adapted to move it the opposite way, a carriage for moving the actuating devices, detachable connections between the carriage and each actuating device, four sets of time stops one for each actuating device, each set consisting of a series of pins adapted to be brought into contact with a card and any pin registering with a hole in the card adapted to project through it and into the path of its actuating device to stop the latter, elapsed time type wheels, one wheel representing one division of time and another another division of time, connections between each differential gear and one of the type wheels, whereby each type wheel will be moved in accordance with the difference between the opposite movements of its differential gear, and the elapsed time between two operations of said machine will be indicated in two divisions of time by the type wheels.

31. In an elapsed time indicating machine, the combination of elapsed time indicating mechanism, a card provided with time marks, two sets of time stops arranged in different alinements, each consisting of a series of pins adapted to be controlled by one of the time marks on a card, one mark representing the time of a first operation and the other mark the time of a second operation, the said marks being in different alinements upon the card and corresponding to the alinements of the two sets of time stops respectively, and two actuating devices also arranged in different alinements, one corresponding to the alinement of one series of pins and the other to the other series of pins, each actuating device being adapted to be actuated by one of its series of pins, and connections between each actuating device and the elapsed time indicating mechanism whereby the latter will be caused to indicate the elapsed time between the said two operations.

32. The combination of two differential gears, one for one division of time and the other for another division of time, two actuating devices for each differential gear arranged in different alinements, one connected to one side of the gear and adapted to move it one way, and the other connected to the other side of the gear and adapted to move it the opposite way, a carriage for moving the actuating devices, detachable connections between the carriage and each actuating device, four sets of time stops one for each actuating device, each set consisting of a series of pins arranged in alinement with its actuating device and adapted to be brought into contact with a card, and any pin registering with a hole in the card adapted to project through it and into the path of its actuating device to stop the latter, elapsed time type wheels, one wheel representing one division of time and another another division of time, connections between each differential gear and one of the type wheels, whereby each type wheel will be moved in accordance with the difference between the opposite movements of its differential gear, and the elapsed time between two operations will be indicated in two divisions of time by the type wheels.

33. The combination of elapsed time type wheels, one representing a higher and another a lower division of time, a device for subtracting one from the indication of the wheel of higher order, a shield to prevent the operative connection of such subtracting device with the said wheel of higher order, means normally tending to remove the shield from its shielding position, restraining means to prevent such removal, and means for rendering such restraining means inoperative, controlled by the type wheel of lower order.

34. The combination of a differential gear, means for moving it one way to represent the absolute time of a first or starting operation, means for moving it the other way to represent the absolute time of a second or finishing operation, the resultant movement of the differential representing the elapsed time between the two operations, elapsed time indicating mechanism connected with and operated by the differential gear to indicate such elapsed time, time indicating mechanism connected with and moved by the means which move the differential gear to represent the time of the first or starting operation, whereby the elapsed time between the two operations and the absolute time of the first operation will be indicated.

35. The combination of a differential gear, means for moving it one way to represent the absolute time of a second or finishing operation, means for moving it the other way to represent the absolute time of a first or starting operation, the resultant movement of the differential representing the elapsed time between the two operations, elapsed time indicating mechanism connected with and operated by the differential gear to indicate such elapsed time, and time indicating mechanism connected with and moved by the means which move the differential gear to represent the time of the second or finishing operation, whereby the elapsed time between the two operations and the absolute time of the second or finishing operation will be indicated.

36. The combination of a differential gear, means for moving it one way to represent the time of a first or starting operation, means for moving it the other way to represent the time of a second or finishing operation, the resultant movement of the differential representing the elapsed time between the two operations, elapsed time indicating mechanism connected with and operated by the differential gear to indicate such elapsed time, time indicating mechanism connected with and moved by the means which move the differential gear to represent the time of the first or starting operation, and time indicating mechanism connected with and driven by the means for moving the differential the other way to represent the time of the second operation, whereby the elapsed time between the two operations and the time of the first operation and the time of the second operation will be indicated.

37. The combination of a card provided with a hole representing, by its location on the card, a certain value; a device adapted to travel across the card and to be stopped in its travel by such hole when in register therewith, means for giving said device a predetermined amount of travel across the card, unless sooner stopped by such hole in the card, and means for causing the line of travel of the said device and the hole to cross or register with each other, whereby the said device will be stopped in its movement by such hole when opposite to or in register therewith, and its movement up to such point will represent the same value as represented by the hole.

38. The combination of a card provided with two data holes, two movable actuating devices each adapted to be controlled in its movement by one of the data holes in the card so that the value of its movement will depend upon the location of said hole in the card, an indicating device connected with and operated by said actuating devices so as to be moved to indicate the difference between the values represented by said actuating devices when controlled by the data holes in the card, and means for causing the card to register accurately with the actuating devices.

39. The combination of a type wheel normally at zero and representing the time of a first or "in" operation, a card provided with a mark representing the time of a first or "in" operation, an actuating device controlled thereby and itself actuating the type wheel, and printing means, whereby the time of the first or "in" operation will be printed upon the card.

40. The combination of a type wheel normally at zero and representing the time of a second or "out" operation, a card provided with a mark representing the time of a second or "out" operation, an actuating device controlled thereby and itself actuating the type wheel, and printing means, whereby the time of the second or "out" operation will be printed upon the card.

41. The combination of elapsed time indicating mechanism standing normally at zero but movable either in an adding or subtraction direction, a differential device adapted to move either in an adding or subtracting direction and connected with the indicating mechanism and adapted to move the latter, two devices representing different times, an actuating device for each time device adapted to be controlled by the latter, connections between each actuating device and the differential device so arranged that one actuating device will be adapted to move the differential in an adding direction and the other actuating device to move it in a subtracting direction, whereby the indicating mechanism will indicate the elapsed time between the two times represented by the time devices.

In testimony whereof, I have signed my name to this specification, in the presence of two subscribing witnesses.

JAMES W. BRYCE.

Witnesses:
 EDWIN SEGER,
 JOHN O. GEMPLER.

Copies of this patent may be obtained for five cents each, by addressing the "Commissioner of Patents, Washington, D. C."